United States Patent
Sato

(10) Patent No.: US 6,734,927 B2
(45) Date of Patent: May 11, 2004

(54) LIQUID CRYSTAL DISPLAY AND METHOD OF FABRICATING THE SAME

(75) Inventor: Yasuhiro Sato, Tokyo (JP)

(73) Assignee: NEC LCD Technologies, Ltd., Kawaski (JP)

( * ) Notice: Subject to any disclaimer, the term of this patent is extended or adjusted under 35 U.S.C. 154(b) by 0 days.

(21) Appl. No.: 10/293,487

(22) Filed: Nov. 14, 2002

(65) Prior Publication Data

US 2003/0067564 A1 Apr. 10, 2003

Related U.S. Application Data

(62) Division of application No. 09/543,767, filed on Apr. 5, 2000.

(30) Foreign Application Priority Data

Apr. 7, 1999 (JP) ............................................. 11-100085

(51) Int. Cl.[7] ............................................. G02F 1/1333
(52) U.S. Cl. ................................................... 349/58
(58) Field of Search ................................................ 349/58

(56) References Cited

U.S. PATENT DOCUMENTS

| 5,375,005 A |   | 12/1994 | Komano ....................... 349/58 |
| 5,442,470 A |   | 8/1995  | Hashimoto ................... 349/58 |
| 5,504,605 A | * | 4/1996  | Sakuma et al. ............... 349/58 |
| 5,570,267 A |   | 10/1996 | Ma .............................. 349/58 |
| 5,680,183 A | * | 10/1997 | Sasuga et al. ................. 349/58 |
| 5,729,310 A | * | 3/1998  | Horiuchi et al. .............. 349/62 |
| 6,104,451 A |   | 8/2000  | Matsuoka et al. ............. 349/58 |
| 6,154,261 A |   | 11/2000 | Shim ........................... 349/58 |
| 6,339,457 B1 |  | 1/2002  | Won ............................ 349/58 |
| 6,421,231 B1 | * | 7/2002 | Jung ........................... 361/681 |
| 6,460,998 B1 |  | 10/2002 | Watanabe .................... 349/58 |
| 6,474,823 B1 |  | 11/2002 | Agata et al. .................. 349/58 |
| 6,501,641 B1 | * | 12/2002 | Kim et al. ................... 361/681 |
| 6,504,587 B1 | * | 1/2003  | Morishita et al. ............ 349/58 |
| 6,540,360 B2 | * | 4/2003  | Furuhata et al. ............. 353/31 |

FOREIGN PATENT DOCUMENTS

| JP | 03-042099   | 2/1991  |
| JP | 05-341306   | 12/1993 |
| JP | 6-51308     | 2/1994  |
| JP | 6-347784    | 12/1994 |
| JP | 07-315466   | 12/1995 |
| JP | 8-114802    | 5/1996  |
| JP | 9-211447    | 8/1997  |
| JP | 10-48599    | 2/1998  |
| JP | 11-24590    | 1/1999  |
| KR | 1990-0003947 | 3/1990 |
| KR | 93-20194    | 10/1993 |

* cited by examiner

*Primary Examiner*—Tarifur R. Chowdhury
(74) *Attorney, Agent, or Firm*—McGinn & Gibb, PLLC

(57) ABSTRACT

In a liquid crystal display, a liquid crystal display panel is held between an upper frame and a lower frame, the upper frame having a display window. The upper frame and the lower frame are integrally molded to be coupled to each other via a U-shaped portion. Here, the upper frame and the lower frame are made by vacuum forming resin material. Thus, the liquid crystal display can be reduced in profile, size, weight, and cost.

10 Claims, 10 Drawing Sheets

LIQUID CRYSTAL DISPLAY AND METHOD OF FABRICATING THE SAME

The present Application is a Divisional Application of U.S. patent application Ser. No. 09/543,767, filed on Apr. 5, 2000.

BACKGROUND OF THE INVENTION

1. Field of the Invention

The present invention relates to a liquid crystal display and a method of fabricating the same.

2. Description of the Related Art

Conventionally, the important factors required of liquid crystal displays includes a lower profile, a smaller size, a lighter weight, and lower costs.

For this purpose, such technologies as described in Japanese Patent Laid-Open Publication No. Hei 6-347784 are used.

FIG. 1 is a disassembled perspective view of a liquid crystal display, illustrating an example of this technology.

This liquid crystal display has at least an upper frame 41, a liquid crystal display panel 42, a drive circuit board 43, a backlight 45, and a lower frame 46. These component members are stacked, and fixed by coupling the upper frame 41 and the lower frame 46 to each other. The upper frame 41 and the lower frame 46 are formed of a thin plate of iron, stainless steel, aluminum, or the like. An appropriate spacer 47 and the like are interposed, as needed, between the component members so that the whole is stacked in tight contact, and thereby fixed and held for integral handling.

In this technique, however, the upper frame 41 and the lower frame 46 are die-molded of a metal material such as aluminum, and therefore formed through a multi-staged press process, promising little reduction in cost. In addition, the coupling and fixing of the upper and lower frames 41 and 46 require the spacer 47 and the like between the component members, thereby contributing to higher costs. Moreover, the coupling and fixing are achieved by means of screws and/or caulking, which give rise to the disadvantage of requiring more labor.

Meanwhile, Japanese Patent Laid-Open Publication No. Hei 9-211447 discloses a technology in which a lower frame 51 is made of polycarbonate, and a metal foil 52 having an electromagnetic shielding function is attached on that polycarbonate surface by using an acrylic adhesive or the like.

The lower frame 51 is made of polycarbonate by vacuum forming. Therefore, this technology offers a prescribed function for the lower frame member in a liquid crystal module while achieving certain effects on the profile reduction, miniaturization, weight reduction, and cost reduction.

However, the technology disclosed in Japanese Patent Laid-Open Publication No.Hei 9-211447 does not arrive at the solution to the problems in Japanese Patent Laid-Open Publication No.Hei 6-347784.

That is, the coupling and fixing of an upper frame 53 and the lower frame 51 requires many parts including a spacer. Besides, the upper frame 53 is die-molded of a metal material such stainless steel, thereby failing to achieve adequate reduction in cost.

Moreover, since the upper frame 53 and the lower frame 51 are different from each other in material, the method of fixing the upper and lower frames 53 and 51 has disadvantages of difficult coupling and fixing, and of great deviations. On this account, positioning and other accuracies needs to be high, which lead to a drawback of having a limit on cost reduction.

SUMMARY OF THE INVENTION

It is an object of the present invention to provide a liquid crystal display of reduced profile, size, weight, and cost, and a method of fabricating the same.

A first liquid crystal display according to the present invention is a liquid crystal display having a liquid crystal display panel held between an upper frame and a lower frame, the upper frame having a display window. Here, the upper frame and the lower frame are coupled to each other via a U-shaped portion. Either of the frames has a first protrusion formed in the vicinity of its end, and the other frame has a second protrusion formed in the vicinity of its end, the second protrusion to be fitted to the inside of the first protrusion. The first protrusion and the second protrusion are formed to differ from each other in direction.

A second liquid crystal display according to the present invention is a liquid crystal display having a liquid crystal display panel held between an upper frame and a lower frame by using an intermediate frame, the upper frame having a display window. Here, either of the upper frame and the lower frame has a protrusion formed in the vicinity of its end. The intermediate frame has a depression formed in the vicinity of its end, the depression to be fitted to the protrusion. The intermediate frame is fixed to the frame so that the liquid crystal display panel is fixed to the upper frame or the lower frame.

A third liquid crystal display according to the present invention is a liquid crystal display having a liquid crystal display panel held between an upper frame and a lower frame by using an intermediate frame, the upper frame having a display window. Here, either the upper frame or the lower frame is provided with a stepped draw for fixing the liquid crystal display panel or the intermediate frame. This stepped draw is put into contact with the liquid crystal display panel or the intermediate frame so that the liquid crystal display panel or the intermediate frame is supported by the stepped draw.

A fourth liquid crystal display according to the present invention is a liquid crystal display having a liquid crystal display panel held between an upper frame and a lower frame, the upper frame having a display window. Either the upper frame or the lower frame has a conductive pattern formed thereon.

A first method of fabricating a liquid crystal display according to the present invention is a method of fabricating a liquid crystal display having a liquid crystal display panel held between an upper frame and a lower frame, the upper frame having a display window. Here, the upper frame and the lower frame are integrally molded to be coupled to each other via a U-shaped portion. The upper frame and the lower frame are vacuum formed of resin material.

A second method of fabricating a liquid crystal display according to the present invention is characterized by that either the upper frame or the lower frame has a conductive pattern formed thereon, and the conductive pattern is formed by screen printing.

According to the present invention, a liquid crystal display can be reduced in profile, size, weight, and cost.

The nature, principle, and utility of the invention will become more apparent from the following detailed description when read in conjunction with the accompanying drawings.

DETAILED DESCRIPTION OF THE PREFERRED EMBODIMENTS

Hereinafter, liquid crystal displays and their fabrication methods according to the embodiments of the present invention will be described concretely with reference to the accompanying drawings.

Figure 1:
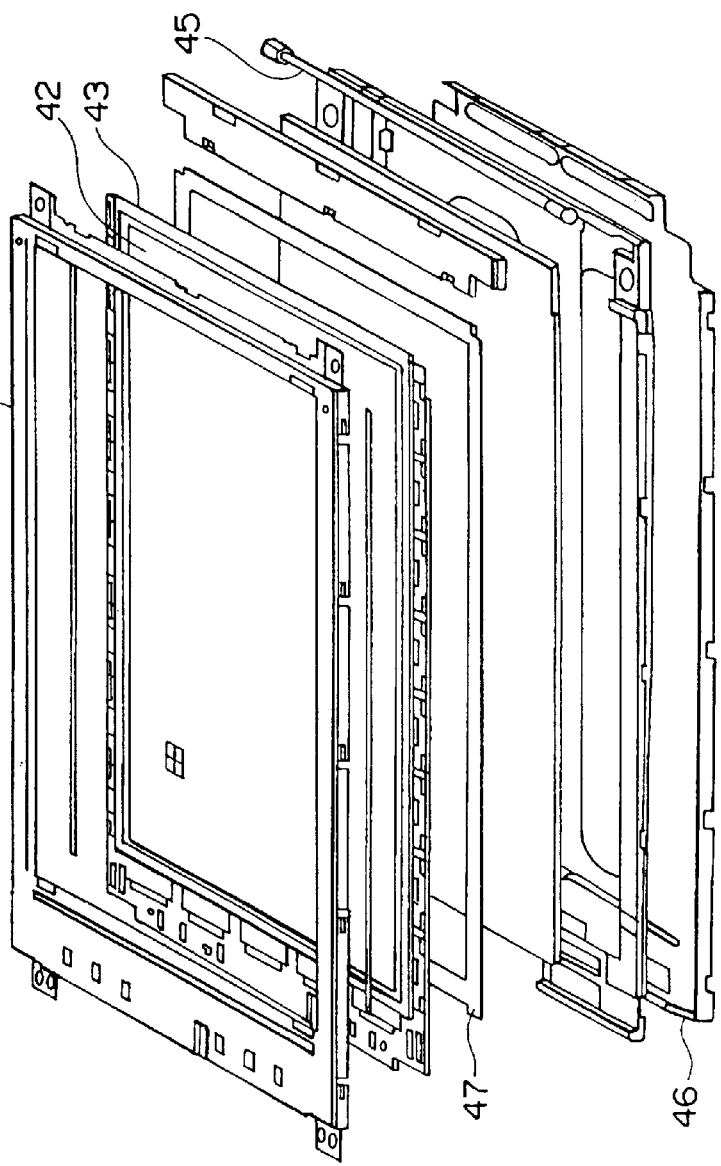
FIG. 1 is a disassembled perspective view of a conventional liquid crystal display.
Figure 2:
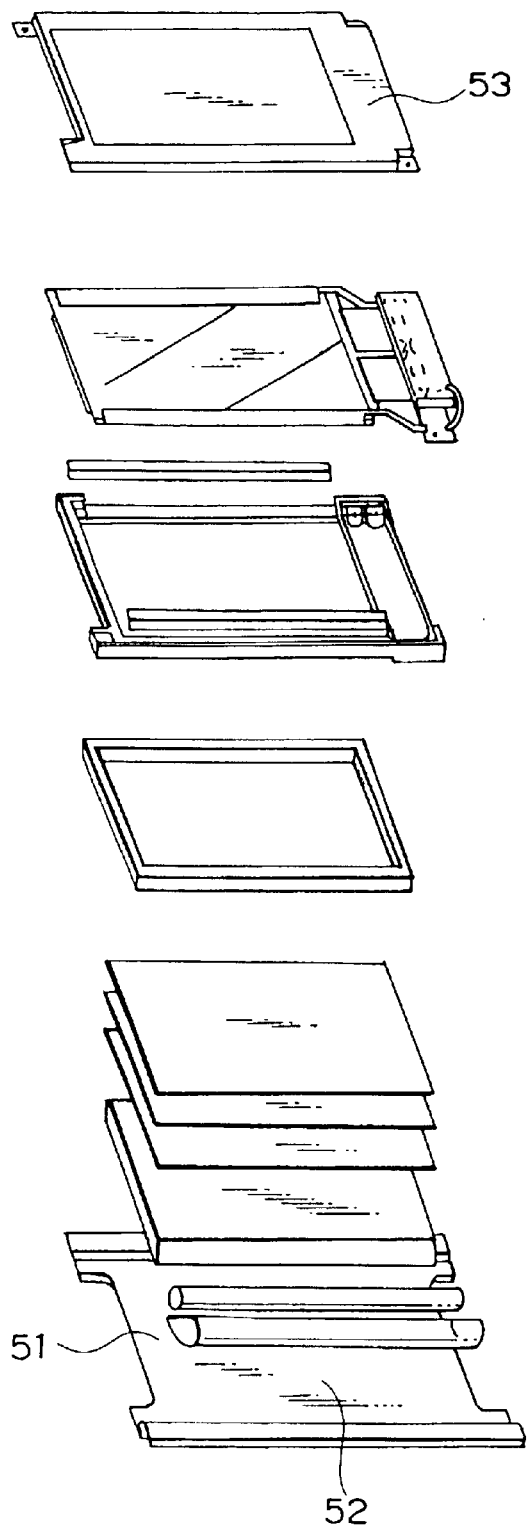
FIG. 2 is a disassembled perspective view of another conventional liquid crystal display.
Figure 3:
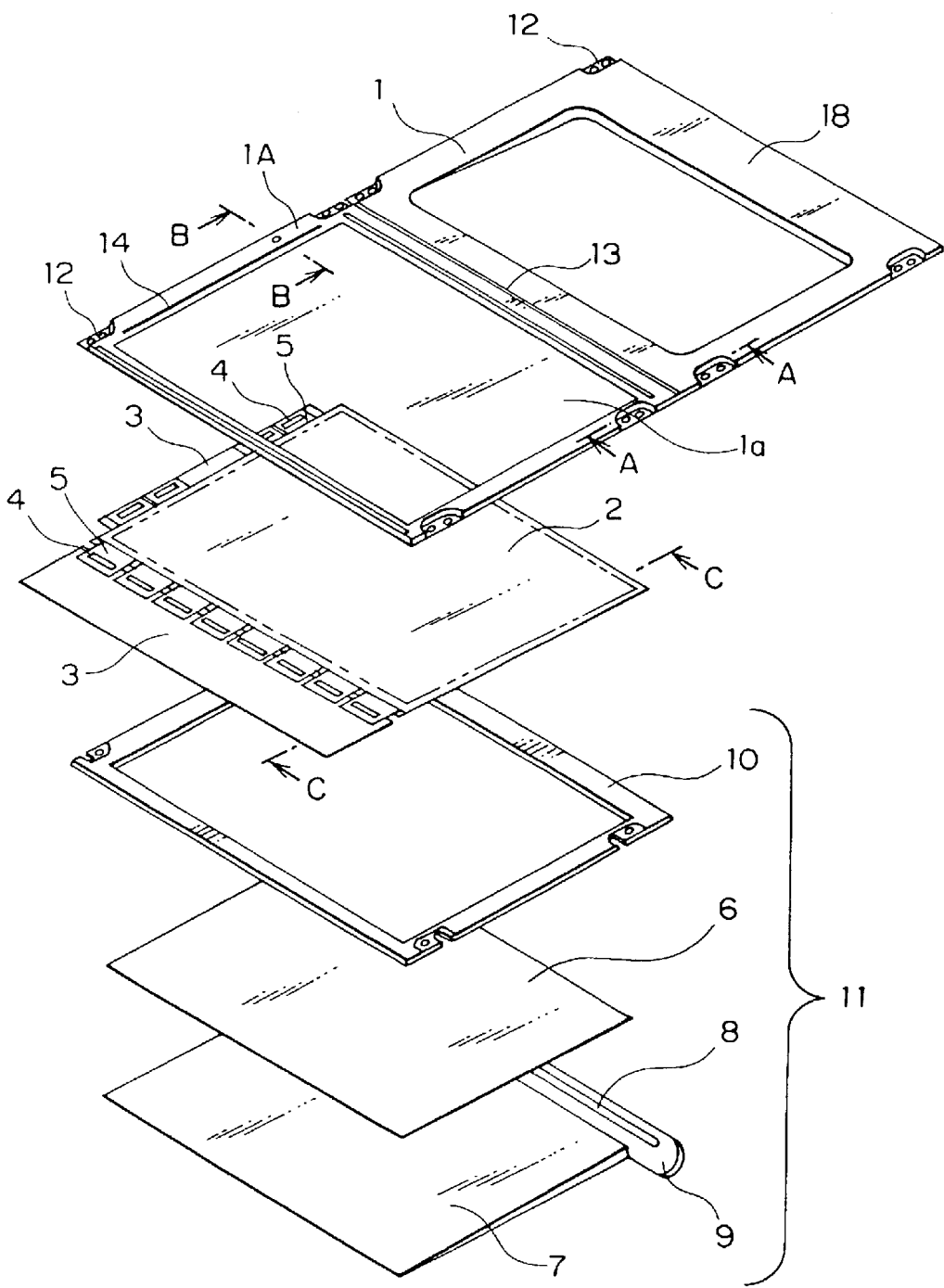
FIG. 3 is a disassembled perspective view of the liquid crystal display according to a first embodiment of the present invention.
Figure 4:
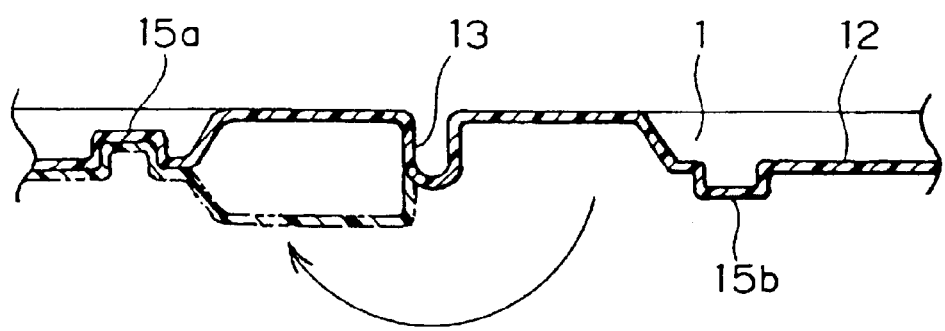
FIG. 4 is a sectional view taken along the line A—A of FIG. 3.
Figure 5:
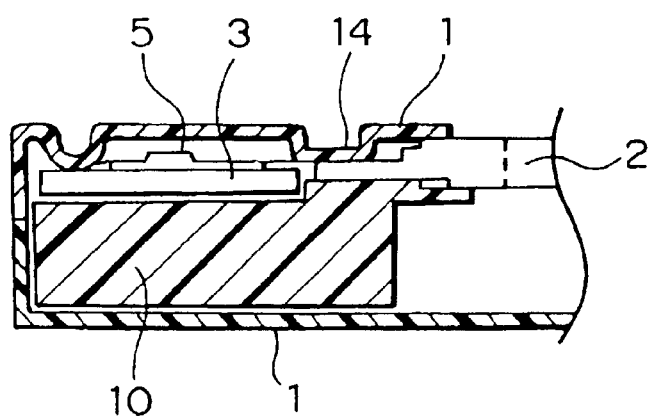
FIG. 5 is a sectional view taken along the line B—B of FIG. 3.
Figure 6:
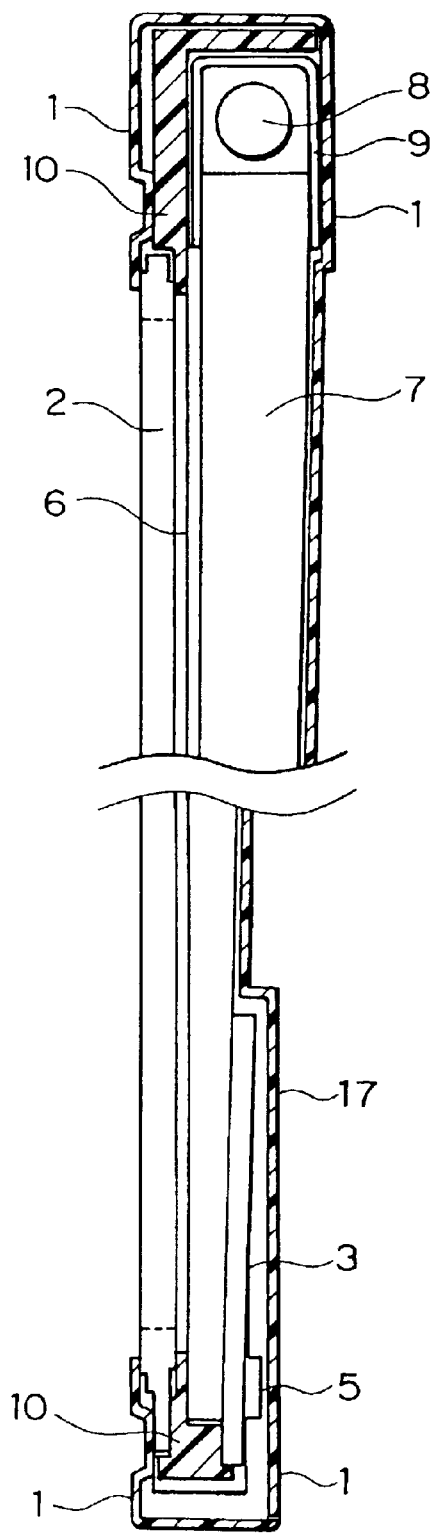
FIG. 6 is a sectional view taken along the line C—C of FIG. 3.
Figure 7:
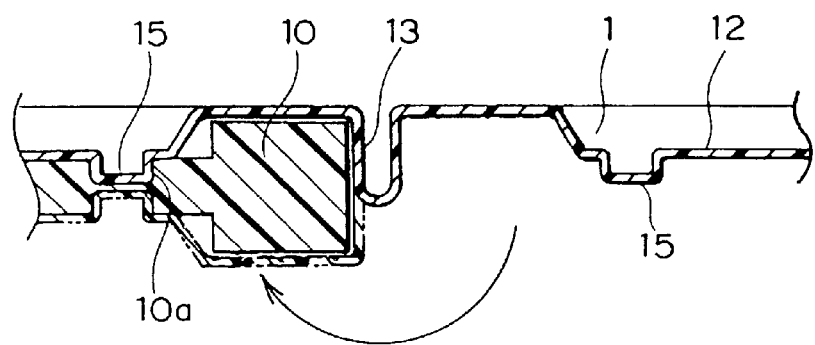
FIG. 7 is a sectional view showing a modified example of the first embodiment.
Figure 8:
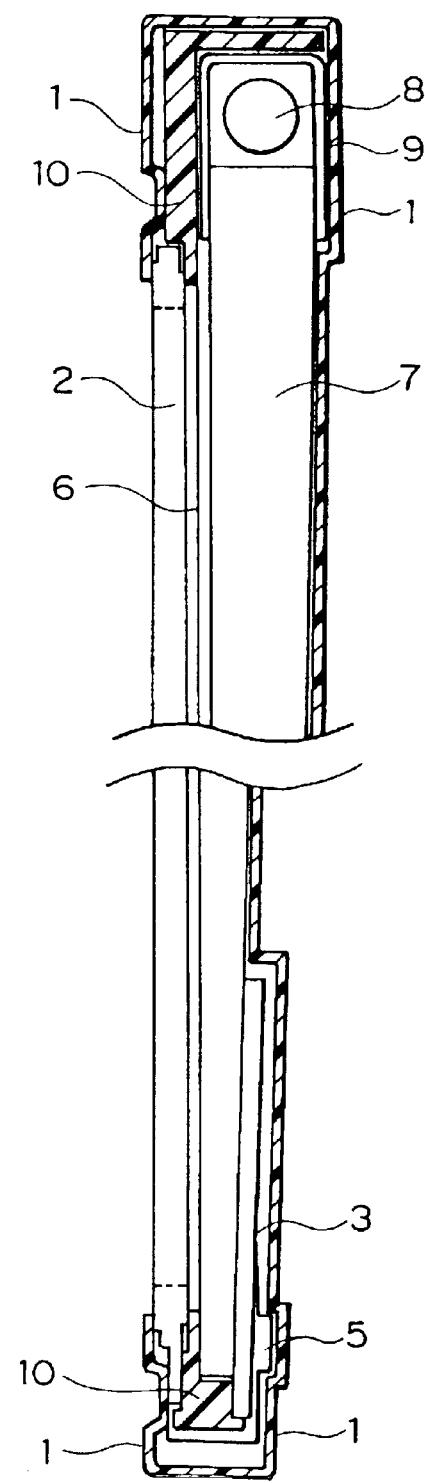
FIG. 8 is a sectional view taken along the line C—C of FIG. 3.

FIG. 3 is the disassembled perspective view of the liquid crystal display in the first embodiment of the present invention. FIGS. 4 and 7 are sectional views taken along the line A—A of FIG. 3. FIG. 5 is a sectional view taken along the line B—B. FIGS. 6 and 8 are sectional views taken along the line C—C.

As shown in FIGS. 3 through 8, the liquid crystal display according to an embodiment of the present invention comprises a frame 1, a liquid crystal display panel 2, and a backlight 11. The frame 1 is formed by vacuum forming. A foldable U-shaped portion having the same thickness as that of the frame is arranged at the center of the frame 1. One side of the frame 1 is provided with a display window corresponding to the display area of the liquid crystal display panel 2. The other side is provided with a drawn configuration corresponding to the backside configuration of the backlight 11. Near the ends of the frame 1 are arranged circular boss configurations 15 for the sake of fixing the folded surfaces to each other. The circular boss configurations 15 have a convex-concave shape. They can be easily fitted to each other so that the liquid crystal display panel 2 and the backlight 11 as stacked can be fixed to the frame 1.

This frame 1 also has the function of covering both the topside of the liquid crystal display 2 and the backside of the backlight 11 so as to make the frame body of the liquid crystal display to fix and hold the members for integral handling.

Due to its structure of smaller parts count, the liquid crystal display can be assembled with facility and in a short time, realizing the profile reduction, miniaturization, weight reduction, and cost reduction of the liquid crystal display.

In addition, the surface of the frame 1 can be coated with an antistatic agent so as to reduce the electrification of the liquid crystal display during assembly and the like. This allows an improvement in the yield of the liquid crystal display.

FIG. 3 is a diagram showing the structure of the liquid crystal display according to a first embodiment of the present invention. As shown in this FIG. 3, the liquid crystal display panel 2 is held between an upper frame 1A and a lower frame 1B, the upper frame 1A having a display window 1a.

As shown in FIG. 4, in this liquid crystal display, the upper frame 1A and the lower frame 1B are coupled to each other via a U-shaped portion 13. Either of the frames has first protrusions 15a formed in the vicinity of its ends, and the other frame has second protrusions 15b formed in the vicinity of its ends, where the second protrusions 15b is to be fitted into the first protrusions 15a. The first protrusions 15a and the second protrusions 15b are formed to differ from each other in protruding direction.

In this liquid crystal display, the liquid crystal display panel 2 is held between the upper frame 1A having the display window 1a and the lower frame 1B by using an intermediate frame 10.

While either of the upper frame 1A and the lower frame 1B has the protrusions 15a formed in the vicinity of its frame ends, the intermediate frame 10 has depressions 10a formed in the vicinity of its ends, the depressions 10a to be fitted to the first protrusions 15a. The intermediate frame 10 is fixed to the frame 1A (1B) so that the liquid crystal display panel 2 is fixed to the upper frame 1A or the lower frame 1B.

Either the upper frame 1A or the lower frame 1B is provided with stepped draws 14 for fixing the liquid crystal display panel 2 or the intermediate frame 10. These stepped draws 14 are put into contact with the liquid crystal display 2 or the intermediate frame 14 so that the liquid crystal display 2 or the intermediate frame 10 is supported by the stepped draws 14.

As shown in FIG. 3, the liquid crystal display comprises the following components: the frame 1 consisting of the upper frame 1A and the lower frame 1B; the liquid crystal display panel 2; and the backlight 11 comprising a light source 8, a light source reflecting member 9, a light conducting plate 7, and a light diffusing plate 6. The liquid crystal display panel 2 has at least tape carrier packages (TCPS) 5 and drive circuit boards 3 mounted thereon. The TCPs 5 are loaded with an IC 4 for driving liquid crystals. In this liquid crystal display panel 2, control signals are input to the liquid crystal elements so as to control them in accordance with the image data input from external devices. The backlight 11 comprises at least the following components: the light diffusing plate 6; the light conducting plate 7 of wedge shape, serving as a surface light source; the light source 8 of linear shape, arranged on the side of the light conducting plate 7 in parallel; the light source reflecting member 9 arranged so as to cover the light source 8; and the intermediate frame 10 for containing these components. Supplying power from an external power supply to the light source 8 turns the light source 8 on. When the light source 8 is lit, the light is incident via the light source reflecting member 9 onto the light conducting plate 7, and then radiated via the light diffusing plate 6 to the backside of the liquid crystal display panel 2. Consequently, an image is displayed on the topside of the liquid crystal display panel 2 by dint of the light incident from the backlight 11.

The flame 1 consisting of the upper frame 1A and the lower frame 1B can be vacuum formed of a thin plate of resin material such as polycarbonate material, into a configuration capable of folding. Here, the surface of the resin material is coated with an antistatic agent. The configuration to be formed by the vacuum forming can be a groove 13 having a cross section of U shape as shown in FIG. 4 (hereinafter, referred to as U-grooved portion or U-shaped portion) or of some near shape, so as to allow 180° folding with reference to the center of the U-grooved portion 13 as shown in FIG. 4. The upper and lower frames 1A and 1B to be folded along the U-grooved portion 13 have liquid crystal display mounting portions 12 formed on the respective surfaces. Besides, the upper frame 1A has the display window 1a which corresponds to the displaying section of the liquid crystal display panel 2. As shown in FIG. 5, on the periphery of the display window 1a are formed the convex stepped draws 14 for holding down the liquid crystal display panel 2, the drive circuit boards 3, the TCPs 5, and the like. As shown in FIG. 6, the lower frame 1B is provided with a draw 17 corresponding to the backside configuration of the backlight 11. This draw 17 covers the backside of the backlight 11 to protect and hold the backlight 11. Even if the TCPs 5 connected to the liquid crystal display panel 2 are folded to the back of the backlight 11 so that the TCPs 5 and the drive circuit boards 3 are formed on the backside of the backlight 11, the lower frame 1B can also be modified in shape, as shown in FIG. 8, to hold and protect the TCPs 5 and the drive circuit boards 3.

As shown in FIGS. 3 and 4, the frame 1 has concavo-convex, circular cylindrical draws (hereinafter, referred to as circular boss configurations) 15a and 15b arranged in the vicinity of its ends for the sake of fixing the upper and lower frames 1A and 1B folded along the U-grooved portion 13. The circular boss configurations 15 are formed into male and female concavo-convex shapes so as to be capable of joining to each other. The circular boss configurations 15 may also be arranged in the liquid crystal display mounting portions 12.

Moreover, as shown in FIG. 7, the circular boss configurations 15 on the frame 1 may also be of convex shape with concave grooves 10a provided in the intermediate frame 10 so that the intermediate frame 10 is joined to the frame 1. Furthermore, depending on the shapes of the circular boss configurations 15, holes may be formed in the intermediate frame 10 so that the intermediate frame 10 is coupled between the upper and lower frames 1A and 1B folded to each other.

With the liquid crystal display panel 2 and the backlight 11 stacked up, the frame 1 can be easily assembled without having to use a screw or the like. This facilitates the assembly, improves the repairability, and thereby offers the effect of reducing costs for the liquid crystal display.

Moreover, the topside (the upper frame 1A) and the backside (the lower frame 1B) of the liquid crystal display is integrated into the frame 1 via the U-grooved portion 13. Therefore, the frame 1 is improved in the position accuracy between the side covering the top surface of the liquid crystal display panel 2 and the side covering the bottom surface of the backlight 11. This reduces the assembly deviations and improves the reliability.

Furthermore, the formation of the stepped draws 14 on the frame 1 eliminates the need for elastic cushion rubber and the like having been used for retaining members, whereby the parts count decreases to reduce costs. Since the frame 1 itself can be made by simple vacuum forming, the need for expensive dies is also eliminated to reduce the costs for the liquid crystal display. In addition, the frame 1 can be coated with an antistatic agent to lower the electrification of the liquid crystal module, thereby improving the yield of the liquid crystal display.

Figure 9A:
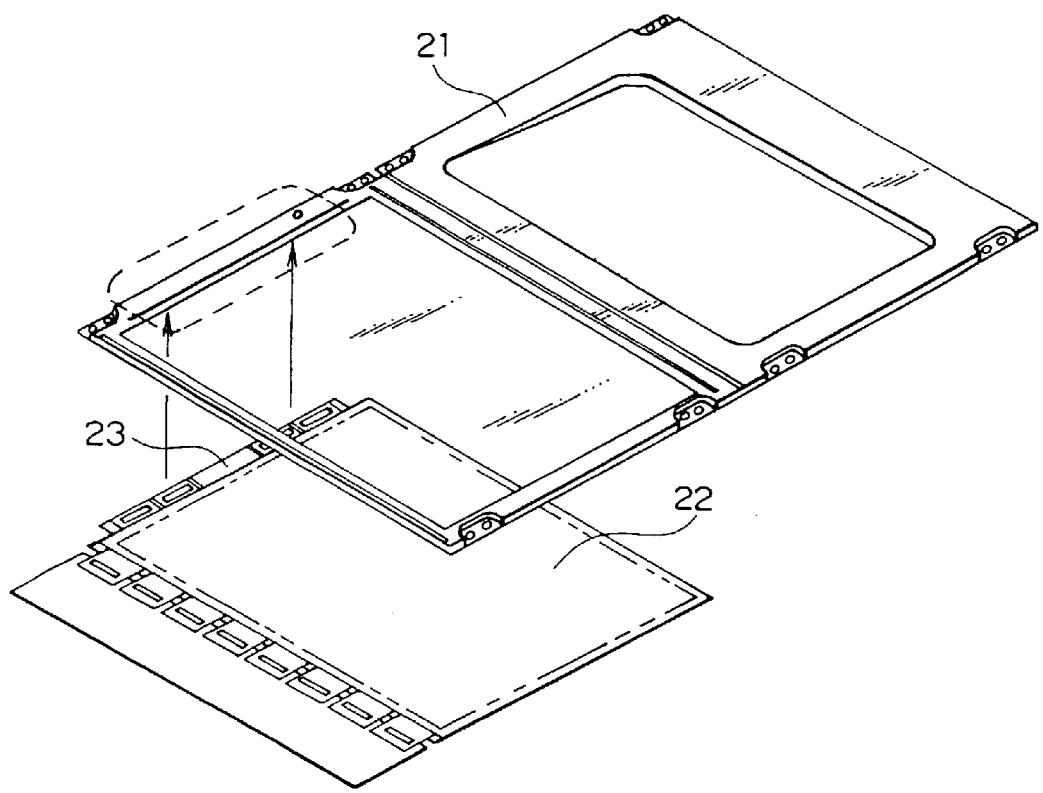
FIG. 9A is a disassembled perspective view of the liquid crystal display according to a second embodiment of the present invention and FIG. 9B is an enlarged partial view of the backside of the frame 21.
Figure 9B:
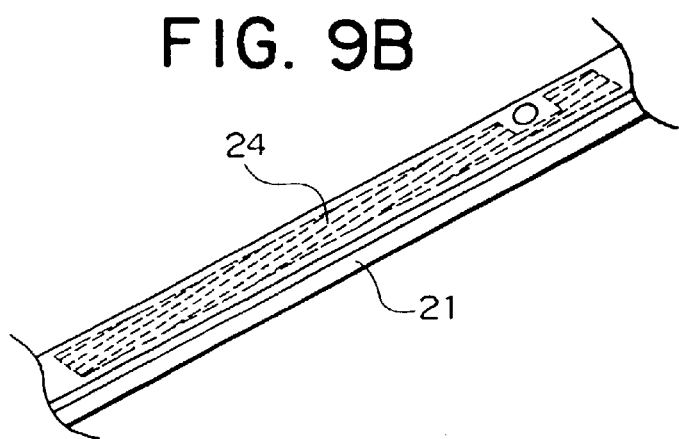

Now, description will be given of a second embodiment of the present invention. FIG. 9A shows the configuration of the frame of the second embodiment. Also, FIG. 9B is an enlarged partial view of the backside of the frame 21. While in the first embodiment the frame surface of the liquid crystal display is subjected to antistatic finish for yield improvement. Incidentally, the liquid crystal display 22 is the same in configuration as that of FIG. 3.

In the second embodiment, as shown in FIGS. 9A and 9B, a back surface of a frame 21 is provided with a layer 24 of metal, formed by screen printing. The suitable materials for this metal layer 24 include copper, aluminum, and nickel. Due to the metal layer 24 provided on its surface, the frame 21 can offer the effect of reducing noises emitted from drive circuit boards 23.

Figure 10:
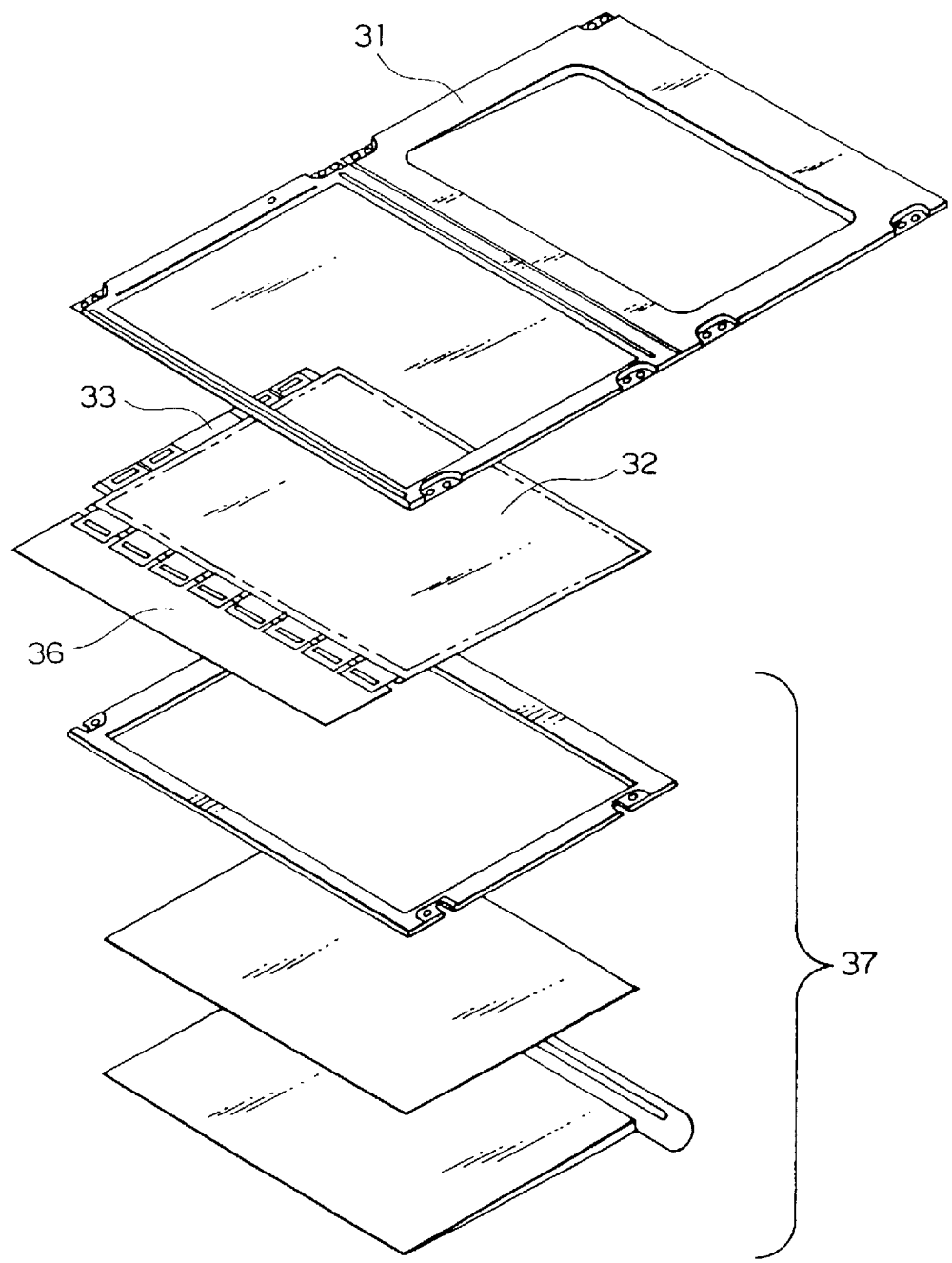
FIG. 10 is a disassembled perspective view of the liquid crystal display according to a third embodiment of the present invention.
Figure 11:
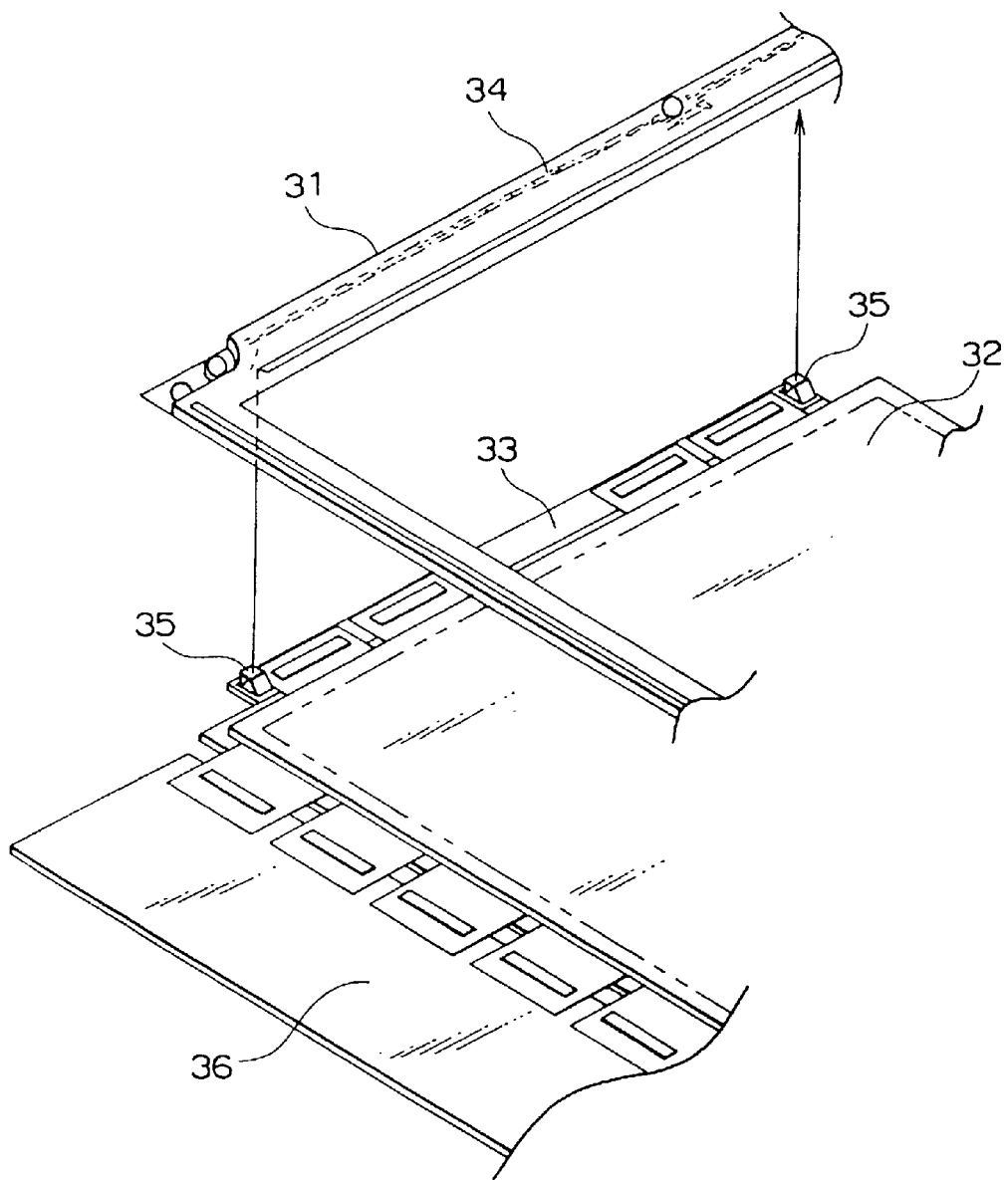
FIG. 11 is an enlarged partial perspective view of the third embodiment.

Next, description will be given of a third embodiment of the present invention. FIGS. 10 and 11 are disassembled perspective views of the third embodiment of the liquid crystal display in the present invention. FIG. 11 is a partial enlarged view of FIG. 10. The third embodiment also has the same configuration as that of the first embodiment.

In this embodiment, a frame 31 consisting of upper and lower frames is provided with a layer 34 of metal, formed by screen printing as in the second embodiment. The metal layer (pattern) 34, however, comprises a wire as thin as approximately 1 mm. This metal wire uses gold, silver, platinum, or the like, as the traces on boards do. Here, metal springs 35 or some cushion members having conductivity are formed on a drive circuit board 33 to be attached to a liquid crystal display 32. The springs 35 or the cushion members are arranged so as to come into contact with the frame 31 on assembly. By this means, the metal layer 34 on the frame 31 and the metal springs 35 on the drive circuit board 33 are brought into continuity. Accordingly, some trace for the drive circuit board 33 can be formed on the frame 31, which allows electric connection to another drive circuit board 36, addition of wiring pattern, and the like. On the frame 31 may be arranged a plurality of traces unless the traces cross each other. Even in the case where the drive circuit board 33 is arranged on the backside of the backlight 37, the connection through the intervention of the frame 31 can be established for electric connection to the backside.

This can simplify the wiring pattern on the drive circuit board 33, thereby allowing the drive circuit board 33 to be reduced in size and cost. The cable or cables required for the connection between the drive circuit boards 33 and 36 can also be eliminated for cost reduction and assembly simplification.

In the first through third embodiments described above, the object of the present invention can also be achieved with the protrusions and the depressions turned into depressions and protrusions, respectively.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A liquid crystal display, comprising:
   a liquid crystal display panel held between an upper frame and a lower frame by using an intermediate frame, said upper frame including a display window, wherein one of said upper frame and said lower frame comprises a stepped protrusion formed in the vicinity of its end;

wherein said intermediate frame comprises a depression formed in the vicinity of its end, the depression to be fitted to said stepped protrusion; and wherein said intermediate frame is fixed to one of said upper frame and said lower frame so that said liquid crystal display panel is fixed to one of said upper frame and said lower frame.

2. The liquid crystal display according to claim 1, wherein the stepped protrusion comprises a rectangular shape.

3. The liquid crystal display according to claim 1, wherein the stepped protrusion comprises a lower portion, and two side portions and opposing ends of said lower portion.

4. The liquid crystal display according to claim 1, wherein the stepped protrusion comprises a circular boss configuration with one of a convex shape and a concave shape capable of joining to each other.

5. The liquid crystal display according to claim 1, wherein the stepped protrusion is integrated into said one of said upper frame and said lower frame.

6. The liquid crystal display according to claim 1, wherein one of said upper frame and said lower frame comprises a plurality of stepped protrusions formed in the vicinity of its end, said plurality of stepped protrusions differing from each other in a protruding direction.

7. A liquid crystal display, comprising:

a liquid crystal display panel held between an upper frame and a lower frame by using an intermediate frame, said upper frame including a display window, wherein one of said upper frame and said lower frame comprises a stepped draw for fixing one of said liquid crystal display and said intermediate frame; and wherein said stepped draw is put into contact with one of said liquid crystal display and said intermediate frame so that one of said liquid crystal display and said intermediate frame is supported by said stepped draw.

8. The liquid crystal display according to claim 7, wherein the stepped draw comprises a rectangular shape.

9. The liquid crystal display according to claim 7, wherein the stepped draw comprises a convex shape for holding said liquid crystal display panel.

10. The liquid crystal display according to claim 7, wherein the stepped draw comprises a cylindrical shape.

* * * * *